April 27, 1926.
J. M. SAULS
FISHING TOOL
Filed Jan. 28, 1926
1,582,485
2 Sheets-Sheet 1
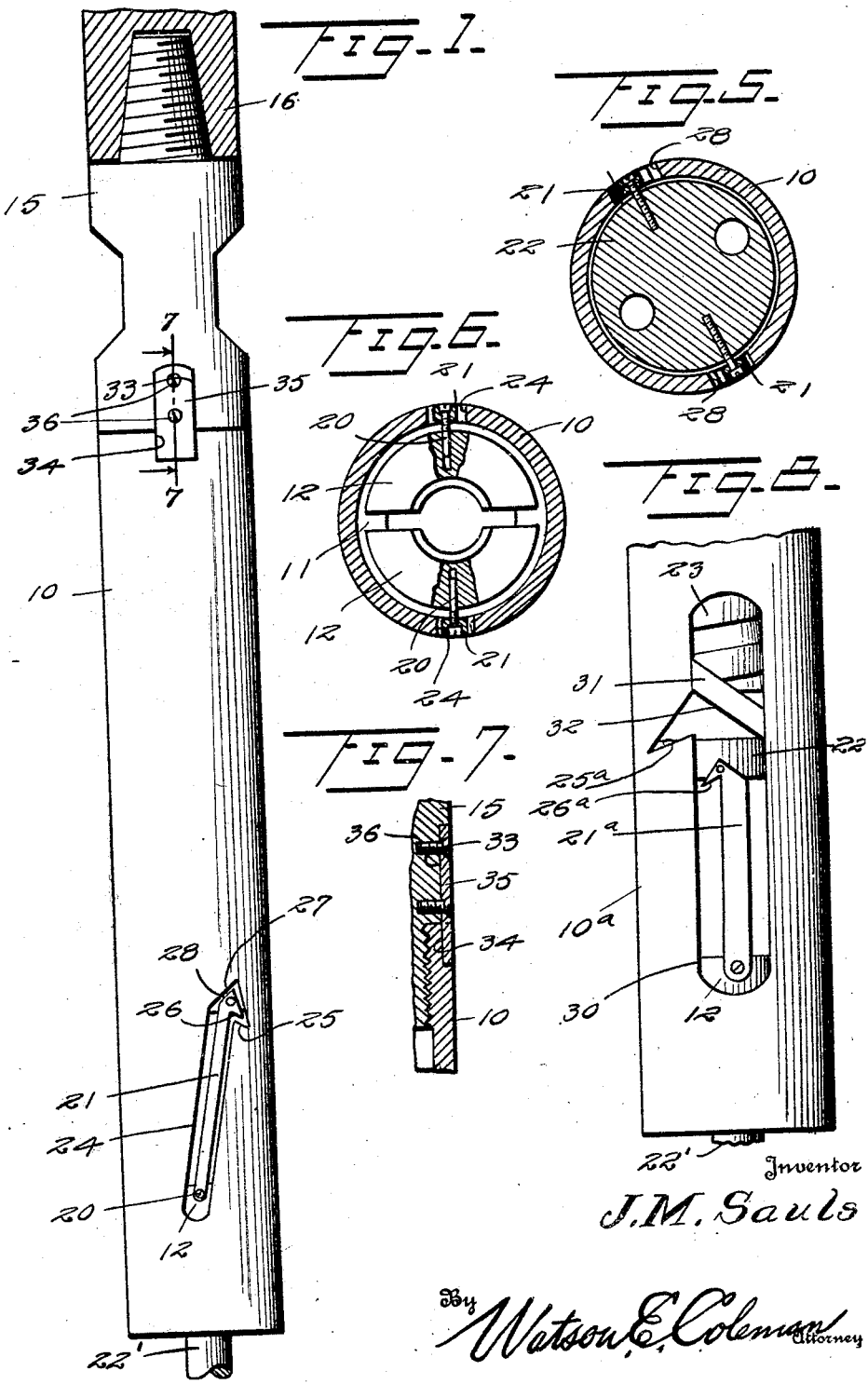
Inventor
J. M. Sauls
By Watson E. Coleman
Attorney

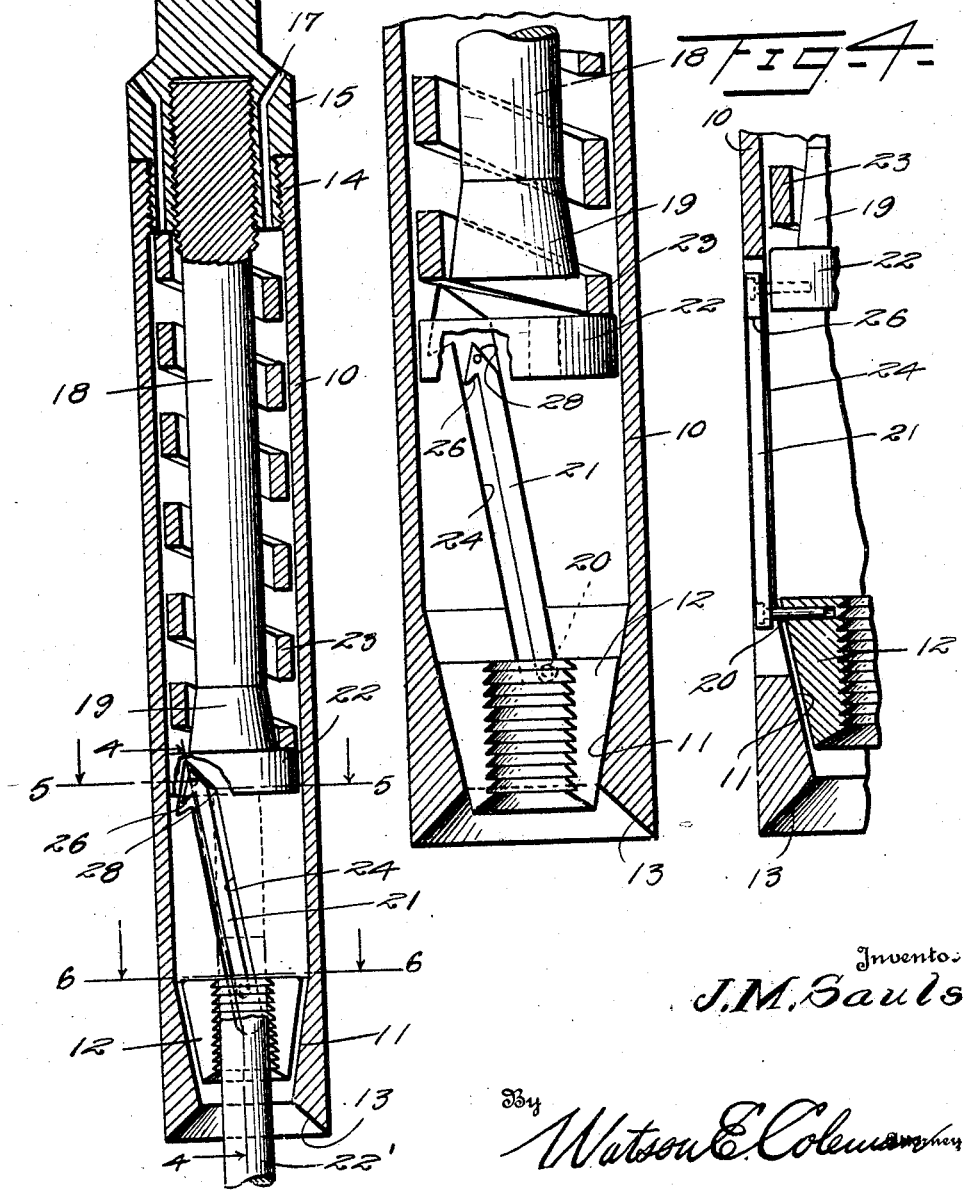

Patented Apr. 27, 1926.

1,582,485

UNITED STATES PATENT OFFICE.

JOHN M. SAULS, OF WORTHAM, TEXAS.

FISHING TOOL.

Application filed January 28, 1926. Serial No. 84,392.

*To all whom it may concern:*

Be it known that I, JOHN M. SAULS, a citizen of the United States, residing at Wortham, in the county of Freestone and State of Texas, have invented certain new and useful Improvements in Fishing Tools, of which the following is a specification, reference being had to the accompanying drawings.

This invention relates to fishing tools and more particularly to a releasing slip socket.

An important object of the invention is to produce a device of this character having means for positively locking the slips in an inoperative position so that the slips may be released from an engaged fish in event it is found that this fish may not be withdrawn from the well.

A further object of the invention is to provide operating mechanism controlling the action of the slips which includes a part enabling the use of the device when the slips are in released position for jarring or otherwise applying force to the element within the well.

A still further object of the invention is to provide a device of this character which may be cheaply and readily produced and which will be durable and efficient in service.

A further object of the invention is to produce a structure such that it may be adapted for use with tools at present upon the market.

These and other objects I attain by the construction shown in the accompanying drawings, wherein for the purpose of illustration is shown a preferred embodiment of my invention and wherein:—

Figure 1 is a side elevation of a slip socket constructed in accordance with my invention;

Figure 2 is a vertical sectional view therethrough;

Figure 3 is an enlarged sectional view showing the slips in the position which they normally assume;

Figure 4 is a section on the line 4—4 of Figure 2;

Figure 5 is a section on the line 5—5 of Figure 2;

Figure 6 is a section on the line 6—6 of Figure 2;

Figure 7 is a section on the line 7—7 of Figure 1;

Figure 8 is a fragmentary side elevation showing a modification of an ordinary fish tool to enable it to function after the manner of my invention.

Referring now more particularly to the drawings, the numeral 10 generally designates an elongated barrel having at its lower end a tapered slip seat 11 for coaction with semi-circular slips 12. The lower face of the barrel is upwardly tapered, as at 13, to direct elements within the well into the bore of the socket. The upper end of this barrel has threaded engagement, as at 14, with a sub 15, by means of which the barrel may be connected to the usual tool joint 16. This sub is preferably provided with water courses 17 for conducting circulating water from the interior of the barrel. The sub likewise forms a support for a driving pin 18 which is threaded into the lower end of the sub and has its lower end somewhat enlarged, as indicated at 19, and arranged in spaced relation to the upper ends of the slips when in their normal position, as illustrated more particularly in Figure 3.

The slips 12 have each pivoted thereto, as at 20, a link 21, the upper end of which is in turn pivotally connected with a disk 22 having a loosely sliding fit in the bore of the barrel 10. These links are of such length that they support the disk 22 in spaced relation to the lower end 19 of the driving pin 18 when the slips are in their normal position. The upper surface of the disk 22 is abutted by the lower end of a tension spring 23, the upper end of which abuts the lower end of the sub 15 between the driving pin 18 and the wall of the barrel 10.

The links 21 each operate within a slot 24 formed in the wall of the barrel 10, these slots being of greater width than the links so that the links have a limited movement therein. Each slot at its upper end has an angular cove 25 adapted to receive an angular bill 26 formed upon the link and the upper end wall of the slot which lies immediately above this cove has a beveled or cam face 27 coacting with a similar face 28 formed upon the upper end of the link to cause the link and the slips supported thereby to be partially rotated so that the bill 26 lies over the lower wall of this cove.

In the use of the device, the socket is lowered into the well and engaged with a fish F in the usual manner. If, after such engagement, it is found that the fish cannot be removed, then the socket is lowered so that the upper end of the fish F comes into engagement with the disk 22. This causes the disk to be elevated and accordingly the links and slip sockets to move upwardly beyond their normal limit. The upper end faces 28 of the links 21 come into engagement with the cam faces 27 with the result that the links and disk are caused to partially rotate so that the bills 26 of the links overlie the lower walls of the cove 25. The socket is then pulled upwardly and the links as they lower will engage their bills with these shoulders so that the links serve to support the slips in an abnormally elevated position where they will not engage with the fish. At this time, if it is desired to apply a downward jar to the fish, this may be accomplished by forcibly lowering the tool against the fish as the slips at this time will not interfere with such an operation. The fish will come into engagement with the disk 22 and through this disk into engagement with the lower end of the driving pin 18 by means of which the jar is applied. In Figure 8, I have generally illustrated the manner in which certain types of slip sockets may be modified to conform with my invention. In the type of tool illustrated, the slip socket 10ᵃ is already provided with vertically extending slots 30 and these slots are employed for housing the links 21ᵃ. One wall of the slot has formed therein the cove 25ᵃ for coaction with the bill 26ᵃ of the link. A bar 31 is inserted in the slot to provide the cam face 32 for directing the link to one side.

Since, in either of the constructions above referred to, a certain amount of rotary movement is imparted to the tool in the operation thereof, it is desirable that some means be provided for preventing relative rotation of the slip socket barrel 10 and the sub 15. To this end, I provide aligning sockets 33 and 34 in the sub and barrel and mount within these sockets a plate 25 held in position by screws 36 engaging the sub. It will, of course, be understood that other means for preventing relative rotation may be provided where necessary.

Since the construction hereinbefore set forth is obviously capable of a certain range of change and modification without materially departing from the spirit of the invention, I do not limit myself to such specific structure except as hereinafter claimed.

I claim:—

1. In a releasing slip socket, a barrel having slip seats, slips engaging said seats, a disk loosely slidable in the bore of the barrel in spaced relation to the upper ends of said slips, links pivotally connected at their lower ends to the slips and at their upper ends to the disk, coacting means upon the wall of the slip socket and upon said links for maintaining the slips and disk in elevated position upon a predetermined elevation thereof, a sub in the upper end of the slip barrel and a depending rigid member carried by said sub and projecting into the barrel and with which said disk is substantially in contact when said disks and slips are supported by said means.

2. In a releasing slip socket, a barrel having slip seats, slips engaging said seats, a disk loosely slidable in the bore of the barrel in spaced relation to the upper ends of said slips, links pivotally connected at their lower ends to the slips and at their upper ends to the disk, slots in the wall of the barrel within which the links operate and within which the links are capable of transverse movement, at least one of said slots having a cove normally in vertically spaced relation to the upper end of the link associated with the slot, the link of the slot having a bill and means at the upper end of the slot for directing said bill into the cove upon a predetermined elevation of the link.

3. In a releasing slip socket, a barrel having slip seats, slips engaging said seats, a disk loosely slidable in the bore of the barrel in spaced relation to the upper end of said slips, links pivotally connected at their lower ends to the slips and at their upper ends to the disk, coacting means upon the wall of the slip socket and upon said links for maintaining the slips and disk in elevated position upon a predetermined elevation thereof, a sub in the upper end of the slip barrel, a depending rigid member carried by said sub and projecting into the barrel and with which said disk is substantially in contact when said disks and slips are supported by said means and a spring within the barrel and surrounding said rigid member and having its lower end engaging the disk to constantly urge the same downwardly.

4. In a releasing slip socket, a barrel having slip seats, slips engaging said seats, a disk loosely slidable in the bore of the barrel in spaced relation to the upper ends of said slips, links pivotally connected at their lower ends to the slips and at their upper ends to the disk, slots in the wall of the barrel within which the links operate and within which the links are capable of transverse movement, at least one of said slots having a cove normally in vertically spaced relation to the upper end of the link associated with the slot, the link of the slot having a bill, means at the upper end of the slot for directing said bill into the cove upon a predetermined elevation of the link and a spring constantly urging the disk downwardly.

5. In a releasing slip socket, a barrel having slip seats, slips engaging said seats, a disk loosely slidable in the bore of the barrel in spaced relation to the upper ends of said slips, links pivotally connected at their lower ends to the slips and at their upper ends to the disk, slots in the wall of the barrel within which the links operate and within which the links are capable of transverse movement, at least one of said slots having a cove normally in vertically spaced relation to the upper end of the link associated with the slot, the link of the slot having a bill, means at the upper end of the slot for directing said bill into the cove upon a predetermined elevation of the link, a sub in the upper end of the slip barrel and a depending rigid member carried by said sub and projecting into the barrel and with which said disk is substantially in contact when said disks and slips are supported by the engagement of the bill of the link in said cove.

6. In a releasing slip socket, a barrel having slip seats, slips engaging said seats, a disk loosely slidable in the bore of the barrel in spaced relation to the upper ends of said slips, links pivotally connected at their lower ends to the slips and at their upper ends to the disk, coacting means upon the wall of the slip socket and upon said links for maintaining the slips and disk in elevated position upon a predetermined elevation thereof, a sub in the upper end of the slip barrel and a depending rigid member carried by said sub and projecting into the barrel and with which said disk is substantially in contact when said disks and slips are supported by said means, said sub and disk having circulation openings formed therein.

7. In a releasing slip socket, a barrel having slip seats, slips engaging said seats, a disk loosely slidable in the bore of the barrel in spaced relation to the upper ends of said slips, links pivotally connected at their lower ends to the slips and at their upper ends to the disk, slots in the wall of the barrel within which the links operate and within which the links are capable of transverse movement, at least one of said slots having a cove normally in vertically spaced relation to the upper end of the link associated with the slot, the link of the slot having a bill and coacting cam surfaces upon the link and the upper end of the slot for directing the bill into the cove upon a predetermined elevation of the link.

In testimony whereof I hereunto affix my signature.

JOHN M. SAULS.